United States Patent
Cho

(10) Patent No.: US 12,393,357 B2
(45) Date of Patent: Aug. 19, 2025

(54) COMPUTING SYSTEM AND OPERATING METHOD FOR ACHIEVING TARGET PERFORMANCE OF THE SAME

(71) Applicant: SK hynix Inc., Gyeonggi-do (KR)

(72) Inventor: Hung Yung Cho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 41 days.

(21) Appl. No.: 18/359,888

(22) Filed: Jul. 27, 2023

(65) Prior Publication Data

US 2024/0289034 A1   Aug. 29, 2024

(30) Foreign Application Priority Data

Feb. 28, 2023   (KR) .......................... 10-2023-0026622

(51) Int. Cl.
   *G06F 3/06*    (2006.01)
   *G06F 11/34*   (2006.01)

(52) U.S. Cl.
   CPC ............ *G06F 3/0631* (2013.01); *G06F 3/061* (2013.01); *G06F 3/064* (2013.01); *G06F 3/0683* (2013.01); *G06F 11/3409* (2013.01)

(58) Field of Classification Search
   None
   See application file for complete search history.

(56) References Cited

U.S. PATENT DOCUMENTS

| 8,838,680 | B1* | 9/2014 | Jia ............................. G06F 9/54 709/203 |
| 2014/0215177 | A1* | 7/2014 | Kim ...................... G06F 1/3275 711/171 |
| 2015/0160863 | A1* | 6/2015 | Mylly .................. G06F 12/0871 711/102 |
| 2018/0260158 | A1* | 9/2018 | Marripudi ........... G06F 11/3034 |
| 2019/0042408 | A1* | 2/2019 | Schmisseur .......... H05K 7/1489 |
| 2022/0222010 | A1* | 7/2022 | Bachmutsky ......... G06F 3/0655 |
| 2023/0035289 | A1* | 2/2023 | Thakore ................ H04L 47/822 |

FOREIGN PATENT DOCUMENTS

KR   10-0858756 B1   9/2008
KR   10-2018-0102480 A   9/2018

* cited by examiner

*Primary Examiner* — Edward J Dudek, Jr.
*Assistant Examiner* — Ralph A Verderamo, III
(74) *Attorney, Agent, or Firm* — IP & T GROUP LLP

(57) ABSTRACT

According to the present technology, a memory system includes a plurality of memory devices each including a plurality of memory blocks, and a memory controller configured to receive information for target performance from an outside and a return request of achievement information indicating whether the target performance is achievable and including group information on each size of one or more necessary groups for achieving the target performance, provide the achievement information to the outside in response to the return request, and allocate memory blocks to the necessary groups based on the achievement information.

19 Claims, 15 Drawing Sheets

| Grade | # of group | Interleaving Method |
|---|---|---|
| G0 (100MB/s) | 1 | |
| G1 (200MB/s) | 1 | Die Interleaving |
| G2 (400MB/s) | 1 | Die Interleaving |
| G3 (600MB/s) | 2 | Channel with Die Interleaving |
| G4 (800MB/s) | 2 | Channel with Die Interleaving |
| G5 (1000MB/s) | 4 | Channel Interleaving |

Predetermined Table for 400MB

COMPUTING SYSTEM AND OPERATING METHOD FOR ACHIEVING TARGET PERFORMANCE OF THE SAME

CROSS-REFERENCE TO RELATED APPLICATION

The present application claims priority under 35 U.S.C. § 119(a) to Korean patent application number 10-2023-0026622 filed on Feb. 28, 2023, the entire disclosure of which is incorporated by reference herein.

BACKGROUND

1. Field of Invention

Embodiments of the present disclosure relate to an electronic device, and more particularly, to a memory system and a method of operating the same.

2. Description of Related Art

A storage device is a device that stores data under control of a host device such as a computer, a smart phone, or a smart pad. The storage device includes a device that stores data in a magnetic disk such as a hard disk drive (HDD), a device that stores data in a semiconductor memory such as a solid state drive (SSD), or a memory card, in particular, a nonvolatile memory.

A memory system is largely configured of a memory device storing data and a memory controller controlling the memory device. The memory controller controls the memory device to store data in a corresponding memory cell area when a data input request for the memory device is received. In the memory system, the memory system includes memory devices connected to a plurality of channels and ways. The memory devices communicate with the memory controller through the channel.

When receiving the data input request from a host, the memory controller controls the memory device to store data in the memory device. In this case, the memory controller is required to effectively control the memory devices for high-speed data processing. The memory controller uses a method of processing a plurality of memory blocks in parallel as a method for controlling a plurality of memory devices, for example, an interleaving method. That is, a data input time or a data read time is reduced by controlling the plurality of memory devices connected to the channel and the way in parallel. When the host utilizes such a configuration, the host may achieve a higher grade of performance.

SUMMARY

An embodiment of the present disclosure provides a memory system and a method of operating the same, transferring requirements necessary for achieving performance in response to target performance required from an outside and a performance related information return request.

According to an embodiment of the present disclosure, a memory system includes a plurality of memory devices each including a plurality of memory blocks, and a memory controller configured to receive information for target performance from an outside and a return request of achievement information indicating whether the target performance is achievable and including group information on each size of one or more necessary groups for achieving the target performance, provide the achievement information to the outside in response to the return request, and allocate memory blocks to the necessary groups based on the achievement information.

According to an embodiment of the present disclosure, a memory system includes a plurality of memory devices each including a plurality of memory blocks, and a memory controller configured to receive, from an outside, information for target performance and information indicating that achievement of the target performance is compulsory, move, to a second one of the memory devices, data from one or more already allocated memory blocks among the plurality of memory blocks within a first one of the memory devices, provide the outside with achievement information including group information on each size of one or more necessary groups for achieving the target performance, and allocate memory blocks to the necessary groups based on the achievement information.

According to an embodiment of the present disclosure, a method of operating a memory system includes receiving information for target performance from an outside and a return request of achievement information indicating whether the target performance is achievable, calculating the achievement information including group information on each size of one or more necessary groups for achieving the target performance, and providing the achievement information to the outside in response to the return request.

According to an embodiment of the present disclosure, a computing system includes a host device configured to provide information for target performance and a return request of achievement information indicating whether the target performance is achievable and including group information on each size of one or more necessary groups for achieving the target performance, and a memory system configured to provide the achievement information to the host device when the target performance is achievable, and allocate a plurality of memory blocks to the necessary groups in response to the return request.

According to an embodiment of the present disclosure, an operating method of a controller for controlling plural memory devices each including plural memory blocks, the operating method comprises allocating, in response to a performance requirement, one or more memory blocks as each of one or more storage units to configure the storage units while selecting one or more channels physically coupled between the controller and the memory devices, selecting, in response to the performance requirement, one or more interleaving schemes applicable for the storage units and the selected channels and controlling, according to the selected interleaving schemes, the memory devices to perform an operation with the storage units to satisfy the performance requirement.

According to the present technology, a memory system and a method of operating the same are provided which transfer requirements necessary for achieving performance in response to performance requested from the outside.

DETAILED DESCRIPTION

Figure 1:
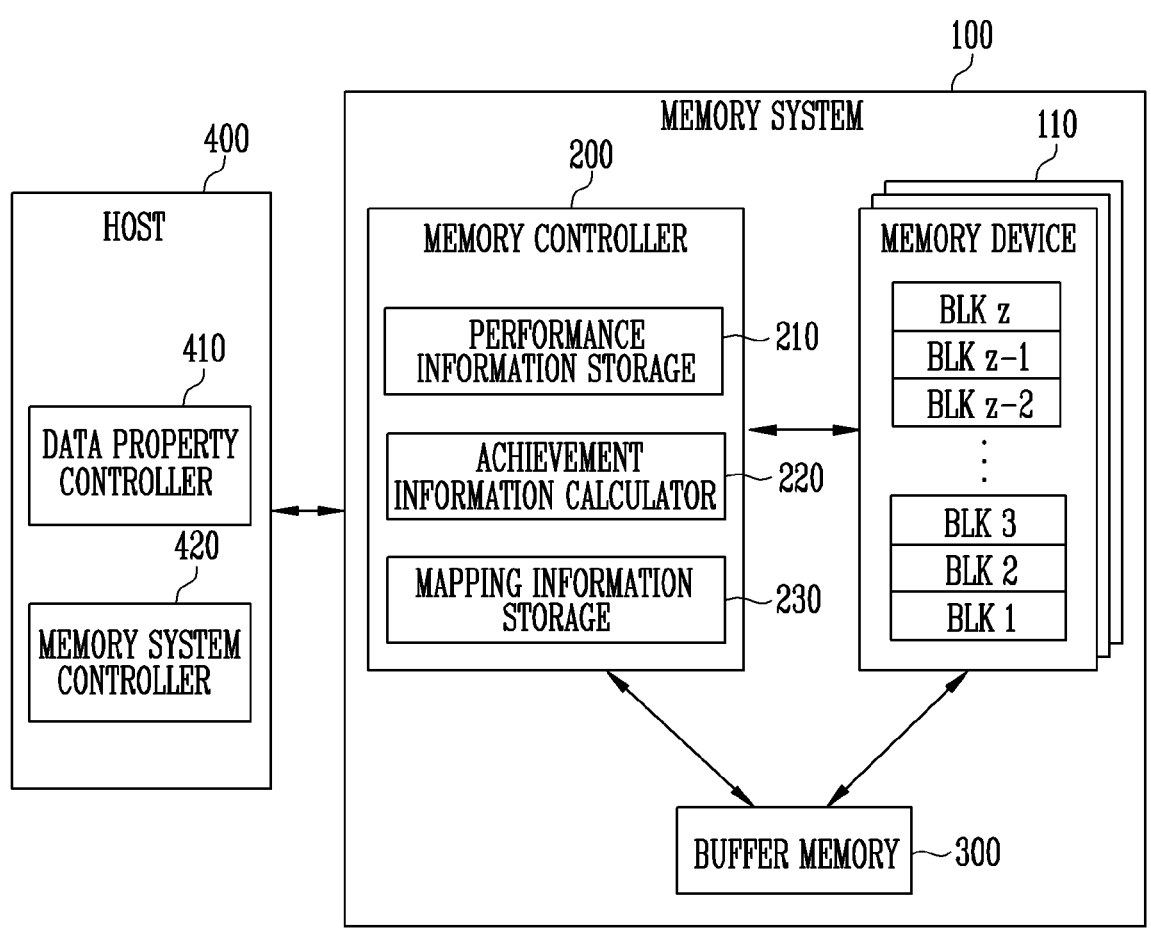
FIG. 1 is a diagram illustrating a memory system according to an embodiment of the present disclosure.

Specific structural or functional descriptions of embodiments according to the concepts which are disclosed in the present specification are illustrated only to describe the embodiments according to the concept of the present disclosure. The embodiments according to the concept of the present disclosure may be carried out in various forms and the descriptions are not limited to the embodiments described in the present specification.

Since various modifications and changes may be applied to the embodiment according to the concept of the present disclosure and the embodiment according to the concept of the present disclosure may have various forms, the specific embodiments will be illustrated in the drawings and described in the present specification. However, it should be understood that the embodiments according to the concept of the present disclosure are not construed as limited to a specific disclosure form and include all changes, equivalents, or substitutes that do not depart from the spirit and technical scope of the present disclosure.

FIG. 1 is a block diagram illustrating a memory system 100 according to an embodiment of the present disclosure.

Referring to FIG. 1, the memory system 100 may include a memory device 110, a memory controller 200, and a buffer memory 300.

The memory system 100 may be connected to a host 400. The host 400 may include a mobile phone, a smart phone, an MP3 player, a laptop computer, a desktop computer, a game console, a TV, a tablet PC, an in-vehicle infotainment system, a drone, an autonomous vehicle, or the like. The host 400 may control the memory system 100 to store data in the memory device 110.

The memory system 100 may be manufactured as any of various types of storage devices according to a host interface which is a communication method with the host 400. For example, the memory system 100 may be configured as any of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick. A computing system may include the host 400 and the memory system 100.

The memory system 100 may be manufactured as any of various types of packages. For example, the memory system 100 may be manufactured as any of various package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 110 may store data. The memory device 110 operates in response to control of a memory controller 200. The memory device 110 may include a memory cell array including a plurality of memory cells storing the data. The memory cell array may include a plurality of memory blocks. Each memory block may include a plurality of memory cells. One memory block may include a plurality of pages. In an embodiment, a page may be a unit for storing data in the memory device 110 or reading data stored in the memory device 110. The memory block may be a unit for erasing data. In an embodiment, the memory device 110 may be a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM), or the like. In the present specification, for convenience of description, the memory device 110 is a NAND flash memory.

The memory device 110 may be implemented as a three-dimensional array structure. The present disclosure may be applied not only to a flash memory device in which a charge storage layer is configured of a conductive floating gate (FG), but also to a charge trap flash (CTF) in which the charge storage layer is configured of an insulating film.

In an embodiment, each of the memory cells included in the memory device 110 may be configured as a single level cell (SLC) storing one data bit. Alternatively, each of the memory cells included in the memory device 110 may be configured as a multi-level cell (MLC) storing two data bits, a triple level cell (TLC) storing three data bits, or a quad level cell (QLC) capable of storing four data bits.

The memory device 110 is configured to receive a command and an address from the memory controller 200 and access an area selected by the address in the memory cell array. That is, the memory device 110 may perform an operation corresponding to the command on the area selected by the address. For example, the memory device 110 may perform a write operation (program operation), a read operation, and an erase operation. During the program operation, the memory device 110 may program data to the area selected by the address. During the read operation, the memory device 110 may read data from the area selected by the address. During the erase operation, the memory device 110 may erase data stored in the area selected by the address.

The memory controller 200 may control an overall operation of the memory system 100.

When power is applied to the memory system 100, the memory controller 200 may execute firmware (FW). When the memory device 110 is a flash memory device, the memory controller 200 may operate firmware such as a flash translation layer (FTL) for controlling communication between the host 400 and the memory device 110.

In an embodiment, the memory controller 200 may receive data and a logical block address (LBA) from the host 400 and convert the LBA into a physical block address (PBA) indicating an address of memory cells which are included in the memory device 110 and in which data is to be stored. In addition, the memory controller 200 may store a logical-physical address mapping table configuring a mapping relationship between the LBA and the PBA in a buffer memory 300.

The memory controller 200 may control the memory device 110 to perform the program operation, the read operation, or the erase operation according to a request of the host 400. During the program operation, the memory controller 200 may provide a program command, the PBA, and data to the memory device 110. During the read operation, the memory controller 200 may provide a read command and the PBA to the memory device 110. During the erase operation, the memory controller 200 may provide an erase command and the PBA to the memory device 110.

In an embodiment, the memory controller 200 may generate and transmit the program command, the address, and the data to the memory device 110 without the request from the host 400. For example, the memory controller 200 may provide the command, the address, and the data for performing background operations such as a program operation for wear leveling and a program operation for garbage collection to the memory device 110.

The memory controller 200 may include a performance information storage 210, an achievement information calculator 220, and a mapping information storage 230.

In an embodiment, the performance information storage 210 may store information on various performances with which the memory system is capable of operating.

The achievement information calculator 220 may calculate achievement information to be returned to the host 400 when the memory controller 200 receives, from the host 400, information on target performance and a return request of achievement information. The achievement information may indicate whether the target performance is achievable by the memory system 100. In addition, the achievement information may include a number of groups in which data is to be stored, a position of the group, and a data interleaving method for storing the data. In an embodiment, the achievement information calculator 220 may calculate plural pieces of the achievement information, i.e., plural solutions to achieve the target performance.

The mapping information storage 230 may store mapping information which is information on a current state of allocated memory blocks within the memory device 110.

The mapping information storage 230 will be described with reference to FIG. 6.

The mapping information storage 230 may provide the mapping information to the achievement information calculator 220 to calculate the achievement information. When the achievement information calculator 220 allocates memory blocks to groups, the mapping information storage 230 may update the mapping information by receiving newly opened groups and a state related to the memory blocks corresponding to the newly opened groups.

In an embodiment, the memory controller 200 may control data exchange between the host 400 and the buffer memory 300. Alternatively, the memory controller 200 may temporarily store system data for controlling the memory device 110 in the buffer memory 300. For example, the memory controller 200 may temporarily store data input from the host 400 in the buffer memory 300, and then transmit the data temporarily stored in the buffer memory 300 to the memory device 110.

In various embodiments, the buffer memory 300 may serve as an operation memory and a cache memory of the memory controller 200. The buffer memory 300 may store codes or commands executed by the memory controller 200. Alternatively, the buffer memory 300 may store data processed by the memory controller 200.

In an embodiment, the buffer memory 300 may be implemented as a dynamic random access memory (DRAM) such as a double data rate synchronous dynamic random access memory (DDR SDRAM), a DDR4 SDRAM, a low power double data rate4 (LPDDR4) SDRAM, a graphics double data rate (GDDR) SDRAM, a low power DDR (LPDDR), or Rambus dynamic random access memory (DRAM), or a static random access memory (SRAM).

In various embodiments, the memory system 100 may not include the buffer memory 300. In this case, volatile memory devices outside the memory system 100 may serve as the buffer memory 300.

In various embodiments, the buffer memory 300 may be included in the memory controller 200.

In an embodiment, the memory controller 200 may control at least two or more memory devices 110. In this case, the memory controller 200 may control the memory devices 110 according to an interleaving method to improve operation performance.

The host 400 may include a data property controller 410 and a memory system controller 420.

The data property controller 410 may generate the information on target performance and the return request of the achievement information. For example, when the host 400 requests the memory system 100 to perform an operation with the target performance, the data property controller 410 may generate the information of the target performance and the return request of the achievement information.

The memory system controller 420 may control the memory system 100. The memory system controller 420 may provide a request, a corresponding address and corresponding data to the memory system 100. The memory system controller 420 may provide the memory system 100 with the return request of the achievement information.

The data property controller 410 may store the achievement information provided by the memory system 100.

In an embodiment, when the memory system 100 can achieve the target performance, the data property controller 410 may generate a request, an address, and data for the memory system 100 to perform an operation with the target performance. The data property controller 410 may generate a write request to store data in the memory system 100 based on the number of groups in which data is to be stored, the position of the groups, and the interleaving method.

In an embodiment, when the number of methods for achieving the target performance is plural, the data property controller 410 may determine one method for achieving the target performance under control of the host 400.

In an embodiment, when the memory system 100 cannot achieve the target performance, the data property controller 410 may generate information on alternative target performance and the return request of alternative achievement information indicating whether the alternative target performance is achievable. For example, when the memory system 100 provides the host 400 with a non-achievement signal indicating that the memory system 100 cannot achieve a particular target performance, the data property controller 420 may generate the information of alternative target performance, which may be lower performance than the particular target performance, and the return request of alternative achievement information indicating whether the alternative target performance is achievable.

The host 400 may communicate with the memory system 100 using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), a load reduced DIMM (LRDIMM), and I2C communication using an SM-BUS.

Figure 2:
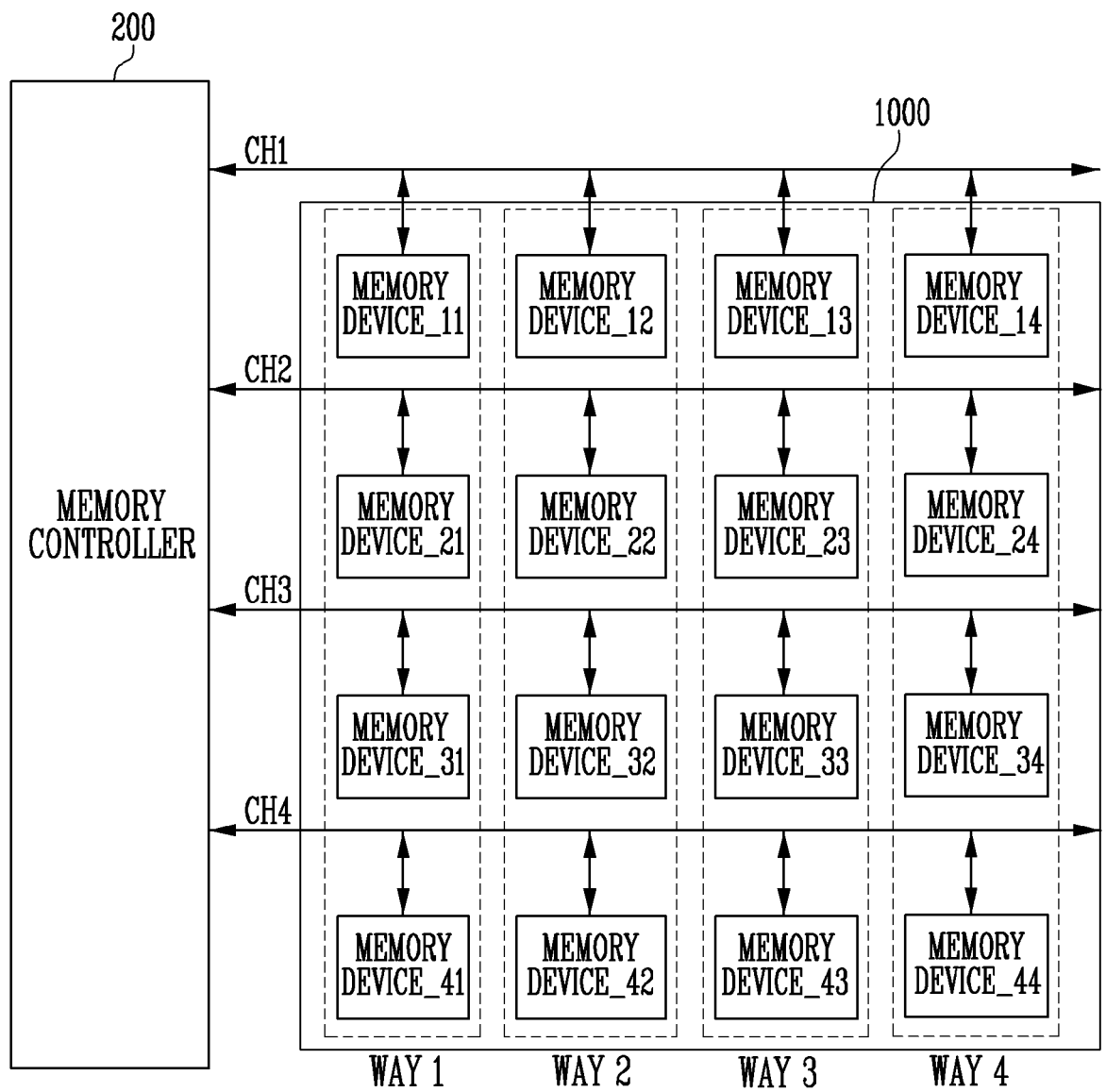
FIG. 2 is a diagram illustrating a connection relationship between a memory controller of FIG. 1 and a plurality of memory devices.

FIG. 2 is a diagram illustrating a connection relationship between the memory controller 200 of FIG. 1 and a plurality of memory devices.

Referring to FIG. 2, the memory controller 200 may be connected to a plurality of memory devices (memory device_11 to memory device_44) through a plurality of channels CH1 to CH4. In an embodiment, the memory controller 200 may be connected to the memory devices through a total of four channels. One channel may be connected to four memory devices. However, this is only an example, and the number of channels connected to the memory controller 200 or the number of memory devices connected to each channel may be variously changed.

A memory package 1000 may include a plurality of memory devices connected to a plurality of channels. Referring to FIG. 2, the memory package 1000 including all memory device_11 to memory device_44, may be connected to the memory controller 200. Although 16 memory devices are included in the memory package 1000 in FIG. 2, the number of memory devices included in the memory package 1000 may also be variously changed.

The memory device_11 to the memory device_14 may be commonly connected to a channel 1 CH1. The memory device_11 to the memory device_14 may communicate with the memory controller 200 through the channel 1 CH1. Since the memory device_11 to the memory device_14 are commonly connected to the channel 1 CH1, only one memory device may communicate with the memory controller 200 at a time. However, internal operations of the respective memory device_11 to the memory device_14 may be performed in a non-exclusive manner.

Memory devices connected to a channel 2 CH2 to a channel 4 CH4 may also operate in the method equal to that of the memory devices connected to the channel 1 CH1 described above.

A storage device using the plurality of memory devices may improve performance by using data interleaving which is data communication using an interleave method. The data interleaving may perform a data read or write operation while moving a way in a structure in which one channel is shared by two or more ways. For the data interleaving, the memory devices may be managed in a unit of the channel and the way. In order to maximize parallelization of the memory devices connected to each channel, the memory controller 200 may distribute successive logical memory areas to the channel and the way and allocate the successive logical memory areas.

For example, the memory controller 200 may transmit a command, a control signal including an address, and data to the memory device_11 through the channel 1 CH1. While the memory device_11 programs the transmitted data to a memory cell included therein, the memory controller 200 may transmit the command, the control signal including the address, and the data to the memory device_12.

In FIG. 2, the plurality of memory devices may be configured of four ways WAY1 to WAY4. The way 1 WAY1 may include the memory device_11 to a memory device_41. Memory devices included in the way 2 WAY2 to the way 4 WAY4 may also be configured in the method equal to that of the memory devices included in the way WAY1 described above.

Each of the channels CH1 to CH4 may be a bus of signals shared and used by memory devices connected to a corresponding channel. Although the data interleaving in a 4 channel/4 way structure is described with reference to FIG. 2, efficiency of interleaving may be increased as the number of channels and the number of ways increase.

Figure 3A:
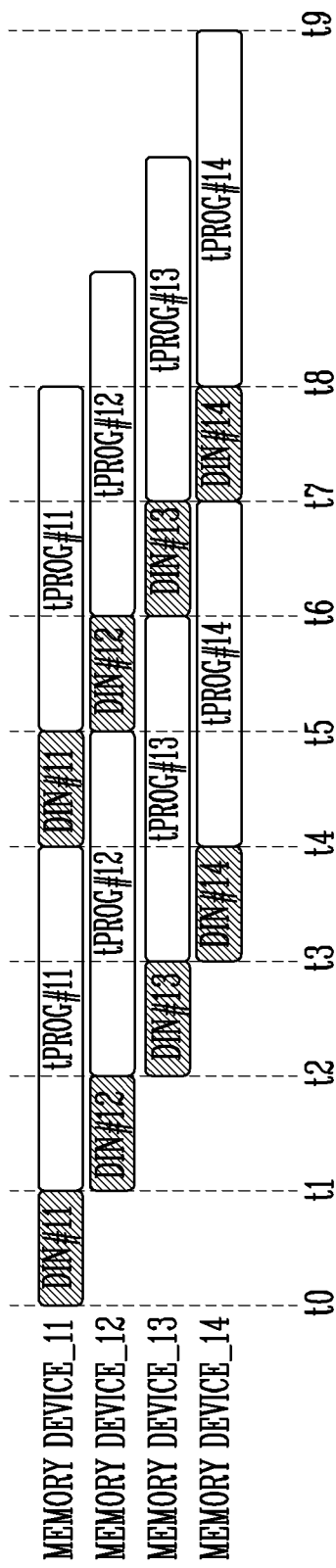
FIGS. 3A and 3B are diagrams illustrating a program operation and a read operation according to a data interleaving.
Figure 3B:
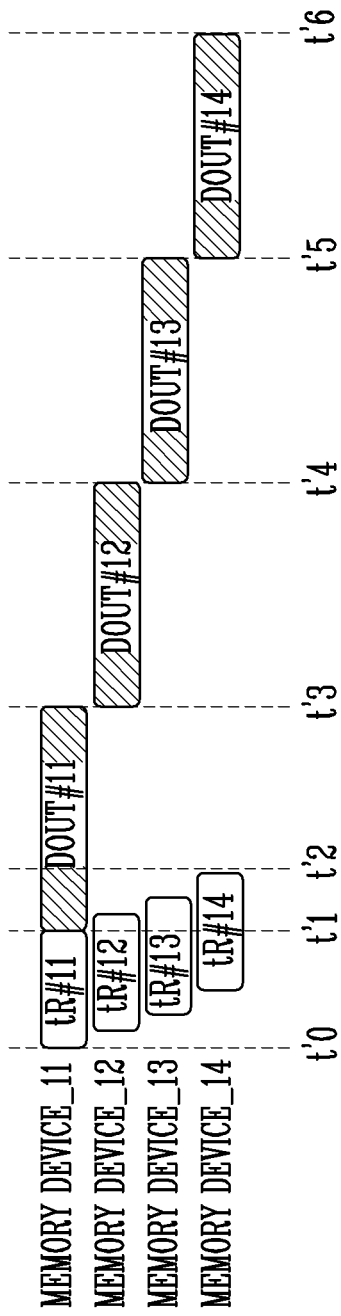

FIGS. 3A and 3B are diagrams illustrating the program operation and the read operation according to a data interleaving.

Referring to FIGS. 3A and 3B, FIG. 3A is a diagram illustrating the program operation. FIG. 3B is a diagram illustrating the read operation. For convenience of description, the program operation of FIG. 3A and the read operation of FIG. 3B on the memory device_11 to the memory device_14 commonly connected to the channel 1 CH1 of FIG. 2 are performed.

Referring to 3A, in t0 to t1, a data input DIN#11 to the memory device_11 may be performed. The memory device_11 may receive a program command, an address, and data through the channel 1 CH1 while the data input DIN#11 is performed. Since the memory device_11, the memory device_12, the memory device_13, and the memory device_14 are commonly connected to the channel 1 CH1, while the data input DIN#11 to the memory device_11 is performed, the memory device_12, the memory device_13, and the memory device_14 which are remaining memory devices may not use the channel 1 CH1.

In t1 to t2, a data input DIN#12 to the memory device_12 may be performed. The memory device_12 may receive the program command, the address, and the data through the channel 1 CH1 while the data input DIN#12 is performed. Since the memory device_11, the memory device_12, the memory device_13, and the memory device_14 are commonly connected to the channel 1 CH1, while the data input DIN#12 to the memory device_12 is performed, the memory device_11, the memory device_13, and the memory device_14 which are remaining memory device may not use the channel 1 CH1. However, since the memory device_11 receives the data in a period t0 to t1 (DIN#11), the memory device_11 may perform the program operation from t1 (tPROG#11).

In t2 to t3, a data input DIN#13 to the memory device_13 may be performed. The memory device_13 may receive the program command, the address, and the data through the channel 1 CH1 while the data input DIN#13 is performed.

Since the memory device_11, the memory device_12, the memory device_13, and the memory device_14 are commonly connected to channel 1 CH1, while the data input DIN#13 to memory device_13 is performed, the memory device_11, the memory device_12, and the memory device_14 which are remaining memory devices may not use the channel 1 CH1. However, since the memory device_11 receives the data in the period t0 to t1 (DIN#11), the memory device_11 may perform the program operation from t1 (tPROG#11). In addition, since the memory device_12 receives the data in a period t1 to t2 (DIN#12), the memory device_12 may perform the program operation from t2 (tPROG#12).

In t3 to t4, a data input DIN#14 to the memory device_14 may be performed. The memory device_14 may receive the program command, the address, and the data through the channel 1 CH1 while the data input DIN#14 is performed. Since the memory device_11, the memory device_12, the memory device_13, and the memory device_14 are commonly connected to the channel 1 CH1, while the data input DIN#14 to the memory device_14 is performed, the memory device_11, the memory device_12, and the memory device_13 which are remaining memory devices may not use the channel 1 CH1. However, since the memory device_11 receives the data in the period t0 to t1 (DIN#11), the memory device_11 may perform the program operation from t1 (tPROG#11). In addition, since the memory device_12 receives the data in the period t1 to t2 (DIN#12), the memory device_12 may perform the program operation from t2 (tPROG#12). In addition, since the memory device_13 receives the data in a period t2 to t3 (DIN#13), the memory device_13 may perform the program operation from t3 (tPROG#13).

At t4, the program operation of the memory device_11 may be completed (tPROG#11).

Thereafter, in t4 to t8, data inputs DIN#11, DIN#12, DIN#13, and DIN#14 to the memory device_11 to the memory device_14 may be performed in the method equal to that performed in t0 to t4.

Referring to 3B, in t'0 to t'2, the memory device_11 to the memory device_14 may respectively internally read data corresponding to a specific address (tR#11 to tR#14). In an embodiment, the memory device_11 to the memory device_14 may read data in a page unit. The memory device_11 may read data during t'0 to t'1 (tR#11) and output the read data to the memory controller 200 through the channel 1 CH1 during t'1 to t'3 (DOUT#11).

Since the memory device_11 outputs the data through the channel 1 CH1 in t'1 to t'3 (DOUT#11), the memory device_12, the memory device_13, and the memory device_14 may not use the channel 1 CH1.

In t'3 to t'4, the memory device_12 may output read data to the memory controller 200 through the channel 1 CH1 (DOUT#12). Since the memory device_12 outputs the data through the channel 1 CH1 in t'3 to t'4 (DOUT#12), the memory device_11, the memory device_13, and the memory device_14 may not use the channel 1 CH1.

In t'4 to t'5, the memory device_13 may output read data to the memory controller 200 through the channel 1 CH1 (DOUT#13). Since the memory device_13 outputs the data through the channel 1 CH1 in t'4 to t'5 (DOUT#13), the memory device_11, the memory device_12, and the memory device_14 may not use the channel 1 CH1.

In t'5 to t'6, the memory device_14 may output read data to the memory controller 200 through the channel 1 CH1 (DOUT#14). Since the memory device_14 outputs the data through the channel 1 CH1 in t'5 to t'6 (DOUT#14), the memory device_11, the memory device_12, and the memory device_13 may not use the channel 1 CH1.

Figure 4:
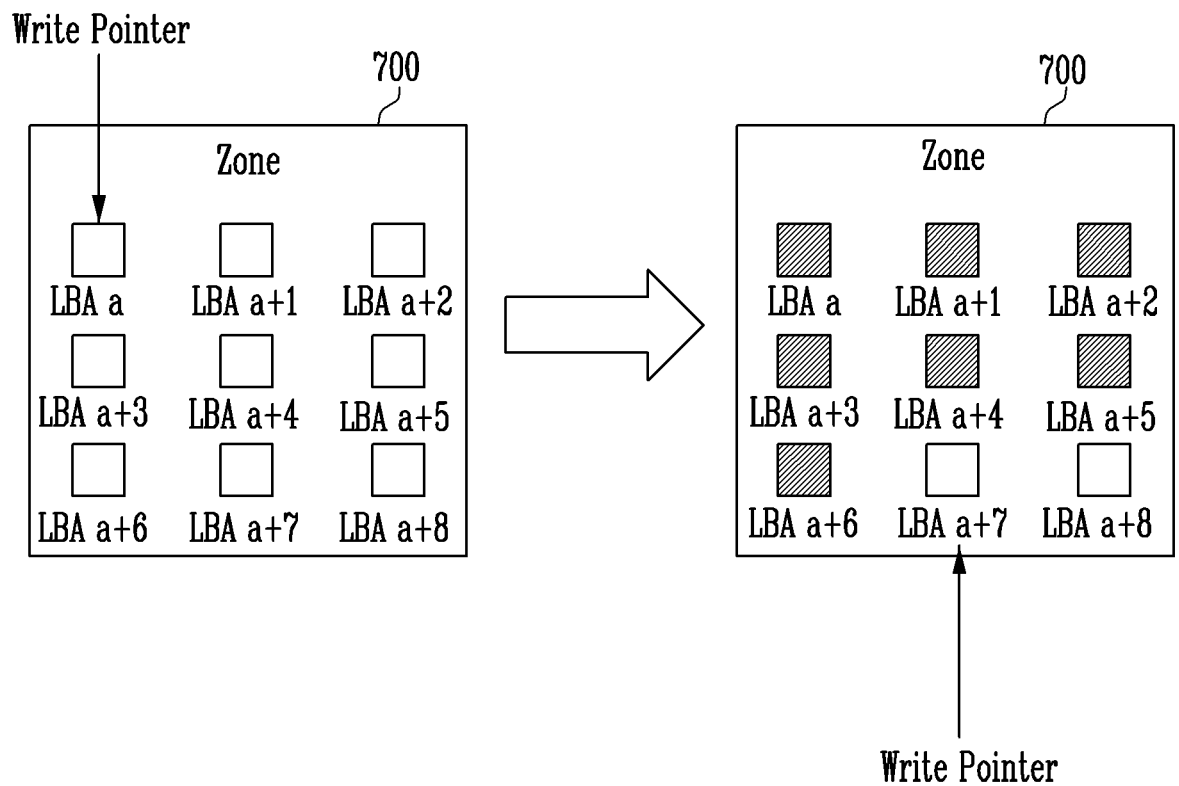
FIG. 4 is a diagram illustrating a structure of a zone in a zone namespace memory system according to an embodiment of the present disclosure.

FIG. 4 is a diagram illustrating a structure of a zone in a zone namespace memory system according to an embodiment of the present disclosure.

A zone namespace (ZNS) may be a technique for dividing a namespace in a unit of a zone 700 and using the namespace. The namespace may be a logical storage space configured by logical blocks. In a data processing system using the ZNS, a plurality of application programs may sequentially store data in LBAs within respectively allocated zones. Not only the plurality of LBAs are divided into the zone, but also physical areas of the memory device may be divided and allocated for the zone 700. One zone 700 may store data for the same application program. In this case, properties of data stored in one zone 700 may be similar. In addition, LBAs included in the zone 700 may be consecutive, and a group of physically consecutive memory blocks may be allocated for each zone. A write pointer (WP) inside the zone 700 may be a pointer pointing to a memory block having a first logical address inside the zone 700. That is, the WP may point to a memory block having the fastest logical block address (LBA a) among empty blocks. Thereafter, when data is input, the data may be sequentially input to the memory block. When data corresponding to seven memory blocks is input, the data may be sequentially input to memory blocks having logical block addresses a to a+6. Thereafter, the WP may point to a memory block having the fastest logical block address LBA a+7 among empty memory blocks. Thereafter, when data is further input, the input data may be stored in a memory block pointed by the WP.

Figure 5:
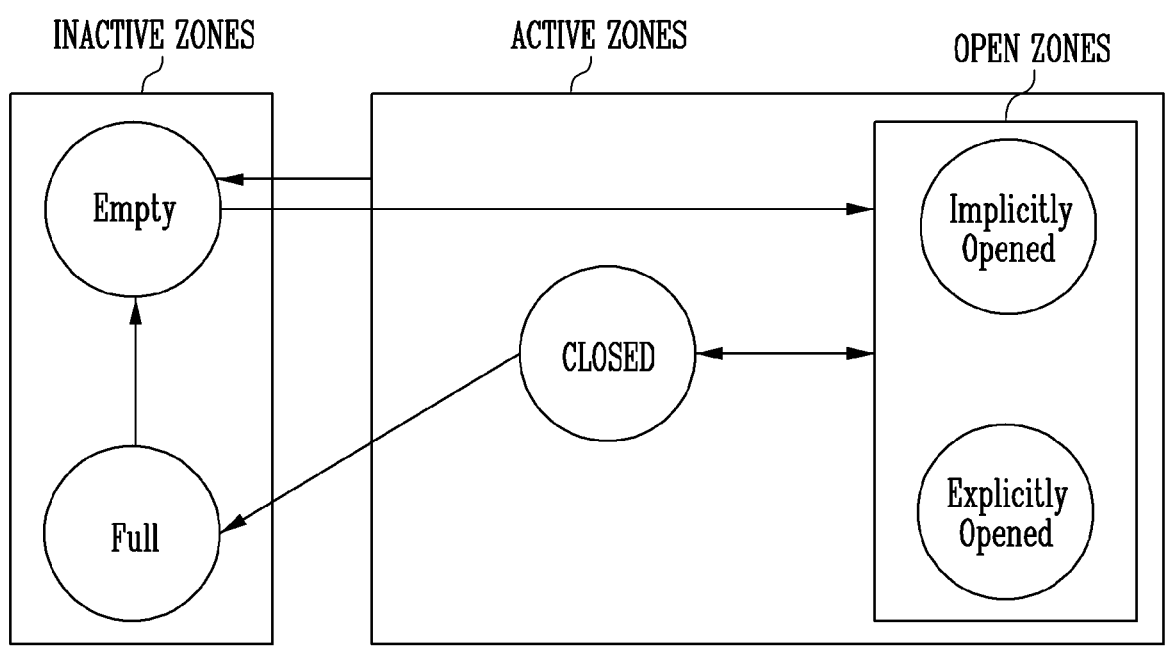
FIG. 5 is a diagram illustrating a state that the zone may have in the zone namespace memory system according to an embodiment of the present disclosure.

FIG. 5 is a diagram illustrating a state that the zone may have in the ZNS memory system according to an embodiment of the present disclosure.

Referring to FIG. 5, the zones may be largely divided into an active zone and an inactive zone according to a state thereof. An initial state of the zones may be an empty zone. The active zone may include an open zone and a closed zone, and the inactive zones may include an empty zone and a full zone. The open zones may be divided into an explicitly open zone and an implicitly open zone. When the host 400 explicitly provides a command to convert any empty zone into the open zone to the memory system, the open zone converted according to the command may be the explicitly open zone. When the host 400 does not explicitly provide a command to convert any empty zone into the open zone, but only provides a program command and identification information for a zone where data is to be stored, the memory controller 200 autonomously may convert the zone where the data is to be stored into the open zone and control the memory device to perform the program operation. The open zone that is autonomously converted by the memory controller 200 may be the implicitly open zone.

In a state in which all areas of a write buffer are allocated to the open zone, when a data input request for a zone other than the open zone is input, the memory controller 200 may convert any of the open zones to the closed zone. The closed zone may be converted from the open zone. Meanwhile, when a data input request for the closed zone is input for the above-described reason, the closed zone may be converted back into the open zone.

The memory controller 200 may convert the open zone into the closed zone when data is input to all pages of a memory block corresponding to the open zone. Thereafter, the memory controller 200 may convert the closed zone into the full zone. The full zone may be a zone in which data may not be stored any more in a memory block corresponding to the zone. When the host 400 provides an erase command for the full zone or the active zone to the memory system, the memory controller 200 may control the memory device to perform an erase operation on a memory block corresponding to the full zone or the active zone. Thereafter, the memory controller 200 may convert the zone corresponding to the memory block on which the erase operation is performed into the empty zone. The empty zone may be a zone in which a memory block corresponding to the zone is in an erase state.

Figure 6:
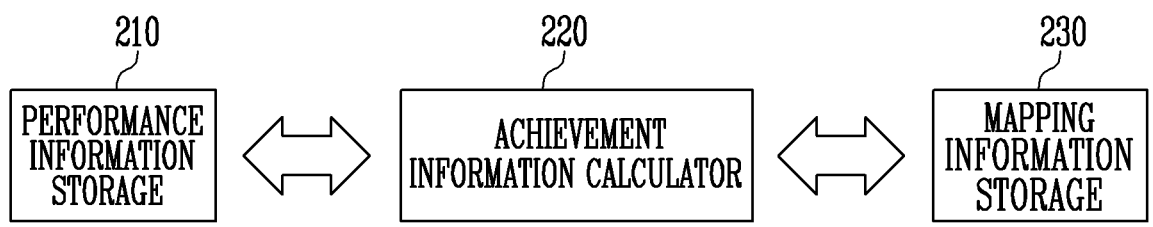
FIG. 6 is a diagram illustrating a structure of a memory controller according to an embodiment of the present disclosure.

FIG. 6 is a diagram illustrating a structure of the memory controller 200 according to an embodiment of the present disclosure.

Referring to FIG. 6, the memory controller 200 may include the performance information storage 210, the achievement information calculator 220, and the mapping information storage 230.

The performance information storage 210 may store the information on various performances or performance information with which the memory system is capable of operating. The performance information may include a graded performance table having information on variously graded performances, with which the memory system 100 is capable of operating. In addition, the performance information may include information on a number of groups necessary for achieving the target performance. Here, a group may be any of the zone, a super block, and the memory block. In addition, the performance information may include information on a method of storing data to achieve the target performance.

The achievement information calculator 220 may allocate memory blocks to the groups for the target performance.

The mapping information storage 230 may provide the mapping information to the achievement information calculator 220 to select the memory block to be allocated to the group necessary for the target performance. The mapping information may include the information on the allocated memory blocks. In addition, the mapping information may include information on a current state of the zones and a memory block allocated to the zones. In addition, the mapping information may include position information of the zones. The mapping information storage 230 may update the mapping information before transferring the mapping information to the achievement information calculator 220.

When the achievement information calculator 220 allocates the memory blocks to the groups necessary for the target performance, the mapping information storage 230 may receive newly opened groups and a state related to memory blocks allocated to the newly opened groups to update the mapping information. A memory block which is not allocated to the groups, in which data is not stored, may be an available block.

The achievement information calculator 220 may select, from the graded performance table, the target performance in response to the target performance and the return request. When the memory controller 200 receives the return request from the host 400, the achievement information calculator 220 may receive the graded performance table from the performance information storage 210. In addition, the achievement information calculator 220 may check, from the graded performance table, the target performance and select the number of groups necessary for achieving the target performance. In addition, the achievement information calculator 220 may determine a data interleaving method to achieve the target performance.

In an embodiment, there may be plural pieces of the achievement information, i.e., plural solutions to achieve the target performance. For example, when there are plural solutions for achieving the target performance, the achievement information calculator 220 may select one of the plural solutions for the achievement information to be provided to the host 400.

Thereafter, the achievement information calculator 220 may receive the mapping information from the mapping information storage 230. The achievement information calculator 220 may calculate whether the target performance is achievable based on the number of necessary groups, the data interleaving method, and the mapping information.

The achievement information calculator 220 may return the achievement information to the host 400.

When the memory system 100 cannot achieve the target performance as a result of the calculation of the achievement information calculator 220, the achievement information calculator 220 may provide the host 400 with the non-achievement signal indicating that the memory system 100 cannot achieve the target performance.

Figure 7:
FIG. 7 is a diagram illustrating an example of a graded performance table stored in a performance information storage of FIG. 6.

FIG. 7 is a diagram illustrating an example of a graded performance table 800 stored in the performance information storage 210 of FIG. 6.

Referring to FIG. 7, the graded performance table 800 stored in the performance information storage 210 of FIG. 6 may include information of graded performances ("Grade"), with which the memory system 100 is capable of operating. In an embodiment, the graded performances may include a lowest performance G0 to a highest performance G5. The graded performances may be classified according to a speed at which the command is processed by the memory system 100. In an embodiment, the performances are graded into the lowest performance G0 to the highest performance G5 for convenience of description, but the present disclosure is not limited to such an embodiment.

The graded performances may be predetermined while designing the memory system 100. In an embodiment, with the lowest graded performance G0, the command may be processed at 100 MB/s. The lowest graded performance G0 may be a minimum performance at which the memory system 100 may operate. Similarly, with the graded performance G1, the command may be processed at 200 MB/s. Similarly, with the highest graded performance G5, the command may be processed at 1000 MB/s. The highest graded performance G5 may be a maximum performance of the memory system 100.

The graded performance table 800 may include information on the number of groups ("# of groups") necessary for achieving a corresponding one of the graded performances G0 to G5. The group may be any of the zone, the super block, and the memory block. The number of necessary groups may vary according to a size of input data or a type of the group. For example, the number of necessary groups may be less when the group is the zone than when the group is the memory block. According to the type of the group, other graded performance tables may be additionally stored. In an embodiment, for convenience of description, the type of the group is the zone, the input data is 400 MB, and memory blocks of 400 MB can be allocated to a single zone.

The graded performance table 800 may include the data interleaving method for each of the graded performances. As described above in the detailed description of FIG. 3, the data interleaving method may be a memory die interleaving method, which is an interleaving method between the plurality of memory devices connected to one channel CH1. In addition, the data interleaving method may further include channel interleaving including interleaving between the plurality of channels CH and the memory device connected to each of the plurality of channels CH. The channel interleaving and the memory die interleaving may be performed in a non-exclusive manner. The channel interleaving may be performed while the memory die interleaving is being performed.

In an embodiment, the number of groups necessary for the graded performance G1 may be one. Similarly, the number of groups necessary for the graded performance G2 may be one. Two memory dies connected to the same channel may be necessary to achieve the graded performance G1. That is, in order to achieve the graded performance G1, 100 MB of data may be processed by each of the two memory dies. This process may be performed in the memory die interleaving method. Similarly, four memory dies connected to the same channel may be necessary to achieve the graded performance G2. That is, in order to achieve the graded performance G2, 100 MB of data may be processed by each of the four memory dies. This process may be performed in the memory die interleaving method. Therefore, even though the number of necessary groups is the same and the interleaving method is the same, the graded performances G1 and G2 may be different.

In an embodiment, the number of groups necessary for the graded performance G3 may be two. Similarly, the number of groups necessary for the graded performance G4 may be two. In order to achieve the graded performance G3, a channel interleaving method using two channels may be used. Similarly, a channel interleaving method through two channels may be used to achieve the graded performance G4.

The channel interleaving and the memory die interleaving may be performed in a non-exclusive manner. In this case, the graded performances G3 and G4 may be different according to the number of memory dies used in the memory die interleaving method in one channel. Therefore, even though the number of necessary groups is the same and the interleaving method is the same, the graded performances G3 and G4 may be different. In an embodiment, the information on the number of groups and the data interleaving method which are included in the graded performance table 800 may be vary.

Figure 8:
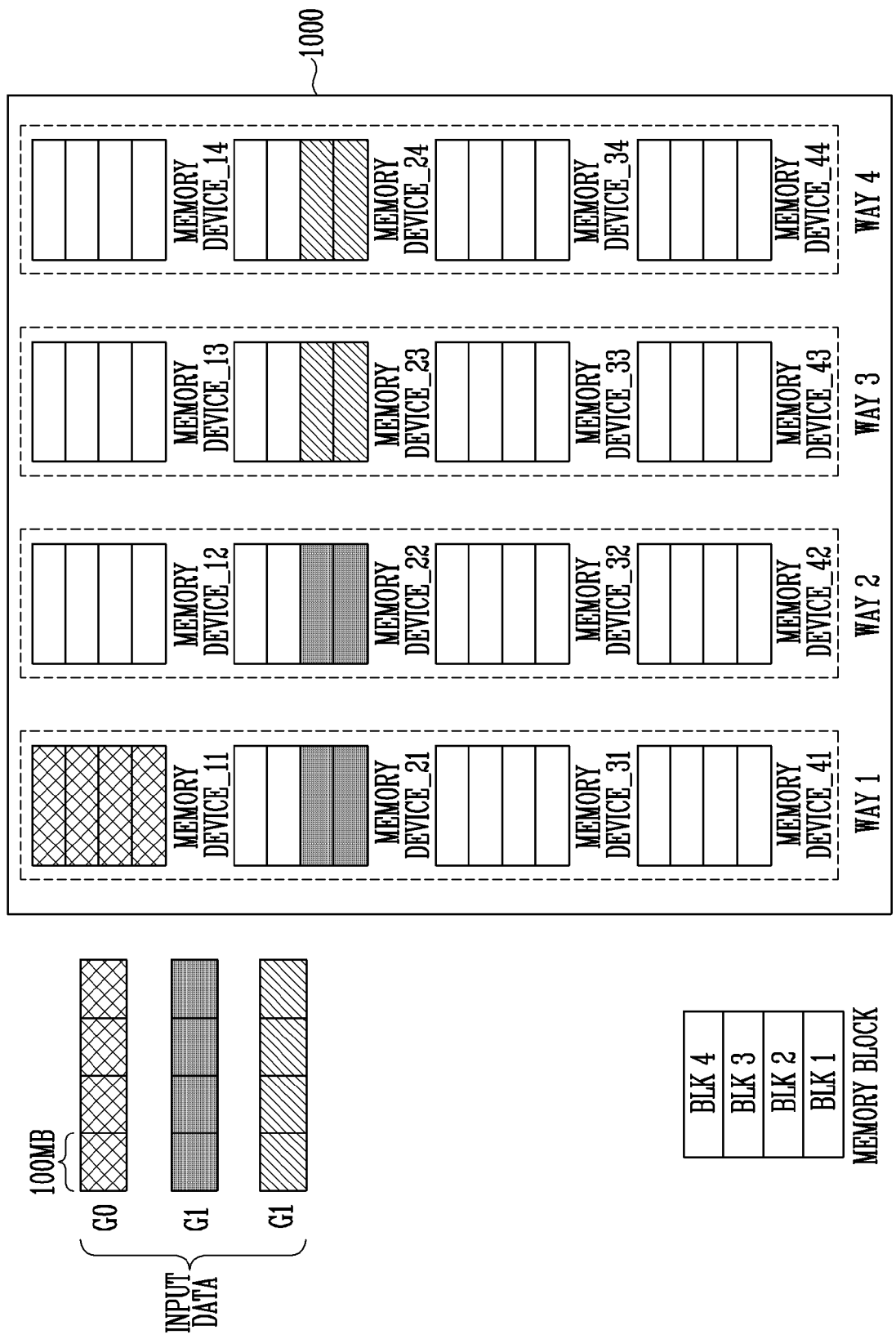
FIG. 8 is a diagram illustrating a process of storing data according to different performances according to an embodiment of the present disclosure.

FIG. 8 is a diagram illustrating a process of storing data according to different performances according to an embodiment of the present disclosure.

Each of the memory devices included in the memory package 1000 shown in FIG. 8 may include four memory blocks, and one memory block may store 100 MB of data. However, this is an example, and the present disclosure is not limited to such an embodiment.

For convenience of description, the memory controller 200 communicates with the memory package 1000 through the four channels CH1 to CH4 as described above in the detailed description of FIG. 2. Four memory dies may be connected to one channel.

Referring to FIG. 8, the host 400 may transfer an input request for 400 MB of data to the memory system with the target performances G0 and G1 among the graded performances shown in FIG. 7. One data block indicates a size of 100 MB, and this is an example. The host 400 may transfer, to the memory system, the input request for 400 MB of data (marked with cross-slashes in FIG. 8) with the target performance G0. In addition, the host 400 may transfer, to the memory system, the input request for 400 MB of data (marked with a dark grey in FIG. 8) with the target performance G1. In addition, the host 400 may transfer, to the memory system, the input request for 400 MB of data (marked with forward slashes in FIG. 8) with the target performance G1.

When the achievement information calculator 220 receives the target performance, the achievement information calculator 220 may check the target performance and select the number of groups for achieving the graded performance. Thereafter, the achievement information calculator 220 in the memory controller 200 may receive the mapping information from the mapping information storage 230 and determine position information of currently assignable groups.

In an embodiment of the present disclosure, one zone may correspond to a 400 MB of memory block. A method for inputting the cross-slashed data block received from the host 400 may include a method of storing data in one memory device, a method of storing data in two memory devices connected to one channel by using the die interleaving method, a method of storing data in four memory devices connected to one channel by using the die interleaving method, a method of storing data in one memory device connected to each of two channels by using the channel interleaving method, and the like.

The target performance G0 may correspond to minimum performance capable of operating the memory system, and may be a method of storing all data in memory blocks included in one memory device. The achievement information calculator 220 may store all data in the memory device_11 in order to process the cross-slashed data block with the target performance G0.

Similarly, a method for inputting the dark-grayed data block received from the host 400 may include a method of storing data in one memory device, a method of storing data in two memory devices connected to one channel using the die interleaving method, a method of storing data in four memory devices connected to one channel by using the die interleaving method, a method of storing data in one memory device connected to each of two channels by using the channel interleaving method, and the like.

The target performance G1 may be immediately higher than the target performance G0 which is the minimum grade at which the memory system may operate, and may be a method of storing data in two memory devices connected to one channel by using the die interleaving method. The achievement information calculator 220 may store 200 MB of data in each of a memory device_21 and a memory device_22 connected to the channel 2 CH2.

Similarly, a methods for inputting the forward-slashed data block received from the host 400 may include a method of storing data in one memory device, a method of storing data in two memory devices connected to one channel by using the die interleaving method, a method of storing data in four memory devices connected to one channel by using the die interleaving method, a method of storing data in one memory device connected to each of two channels by using the channel interleaving method, and the like. The target performance G1 may be an immediately higher performance than the target performance G0 which is the minimum grade at which the memory system may operate, and may be a method of storing data in two memory devices connected to one channel by using the die interleaving method. The achievement information calculator 220 may store 200 MB of data in each of a memory device_23 and a memory device_24 connected to the channel 2 CH2.

Figure 9:
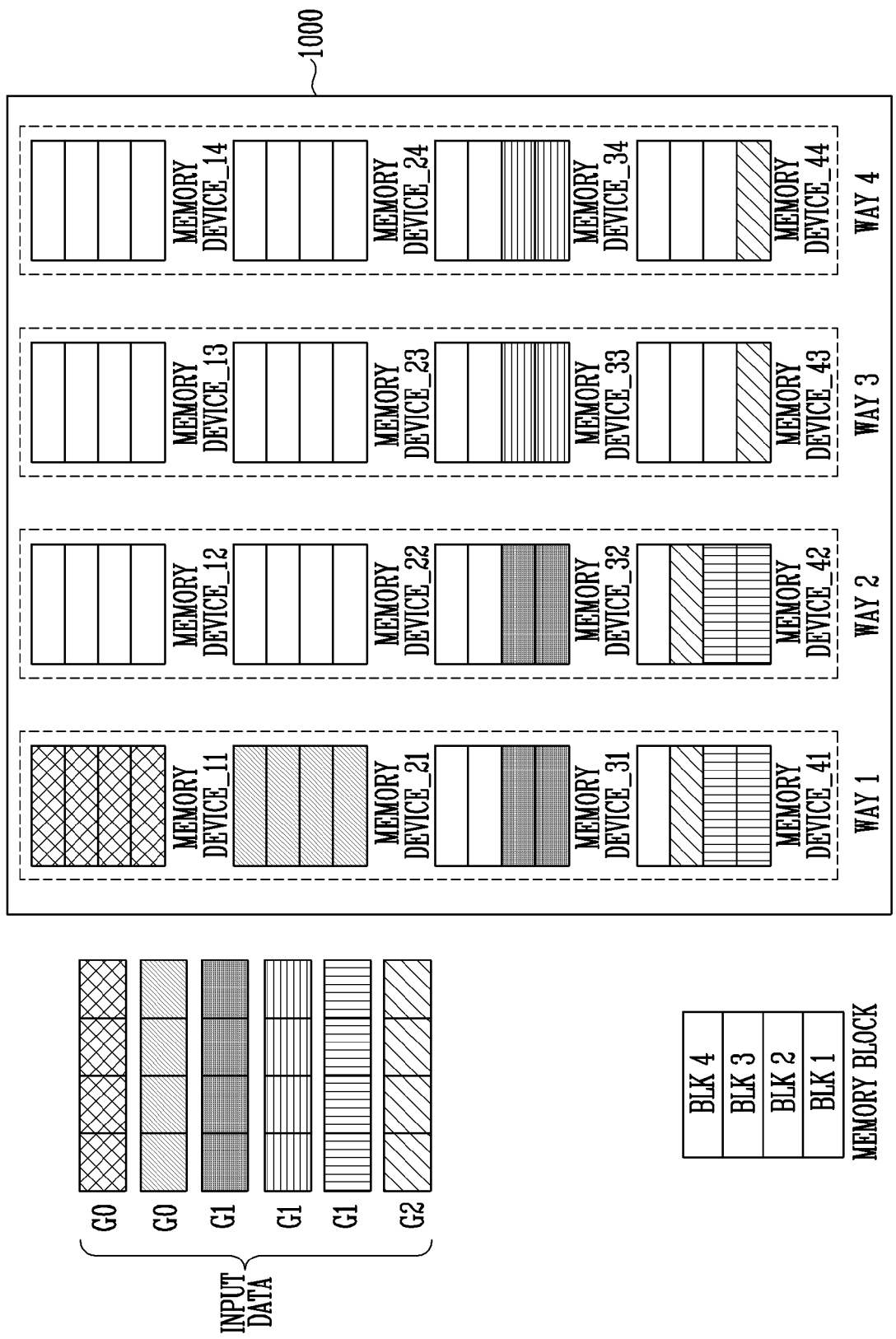
FIG. 9 is a diagram illustrating a process of storing data according to different performances according to another embodiment of the present disclosure.

FIG. 9 is a diagram illustrating a process of storing data according to different performances according to another embodiment of the present disclosure.

Each of the memory devices included in the memory package 1000 shown in FIG. 9 may include four memory blocks, and one memory block may store 100 MB of data. However, this is an example, and the present disclosure is not limited to such an embodiment.

For convenience of description, the memory controller 200 communicates with the memory package 1000 through the four channels CH1 to CH4 as described in the detailed description of FIG. 2. Four memory dies may be connected to one channel.

Referring to FIG. 9, the host 400 may request a 400 MB of data input with the target performances G0, G1, and G2 among the graded performances shown in FIG. 7. One data block indicates a size of 100 MB, and this is an example. The host 400 may transfer, to the memory system, the input request for 400 MB of data (marked with cross-slashes in FIG. 9) with the target performance G0. In addition, the host 400 may transfer, to the memory system, the input request for the 400 MB of data (marked with a light grey in FIG. 9) with the target performance G0. In addition, the host 400 may transfer, to the memory system, the input request for the 400 MB of data (marked with a dark grey in FIG. 9) with the target performance G1. In addition, the host 400 may transfer, to the memory system, the input request for the 400 MB of data (marked with a horizontal hatch pattern in FIG. 9) with the target performance G1. In addition, the host 400 may transfer, to the memory system, the input request for the 400 MB of data (marked with a vertical hatch pattern in FIG. 9) with the target performance G1. In addition, the host 400 may transfer, to the memory system, the input request for the 400 MB of data (marked with forward slashes in FIG. 9) with the target performance G2.

As described above in the detailed description of FIG. 8, one zone may correspond to a 400 MB of memory block. A method for inputting the cross-slashed data block received from the host 400 may include a method of storing all data in one memory device, a method of storing data in two memory devices connected to one channel by using the die interleaving method, a method of storing data in four memory devices connected to one channel by using the die interleaving method, a method of storing data in one memory device connected to each of two channels by using the channel interleaving method, and the like.

The target performance G0 may correspond to the minimum performance capable of operating the memory system. The achievement information calculator 220 may store all data in the memory device_11 in order to process the cross-slashed data block with the target performance G0.

The achievement information calculator 220 may store all data in the memory device_21 in order to process the light-grayed data block with the target performance G0.

Similarly, the achievement information calculator 220 may store 200 MB of data in each of a memory device_31 and a memory device_32 in order to process the dark-grayed data block with the target performance G1. In this process, the die interleaving method may be utilized.

Similarly, the achievement information calculator 220 may store 200 MB of data in each of a memory device_33 and a memory device_34 in order to process the horizontally hatched data block with the target performance G1. In this process, the die interleaving method may be utilized.

Similarly, the achievement information calculator 220 may store 200 MB of data in each of a memory device_41 and a memory device_42 in order to process the vertically hatched data block with the target performance G1. In this process, the die interleaving method may be utilized.

The target performance G2 may be an immediately higher performance than the target performance G1, and may be a method of interleaving data in four memory devices connected to one channel. The achievement information calculator 220 may store 100 MB of data in each of a memory device_41 to a memory device_44 connected to the channel 4 CH4. During this process, data may be stored through the die interleaving method.

Figure 10:
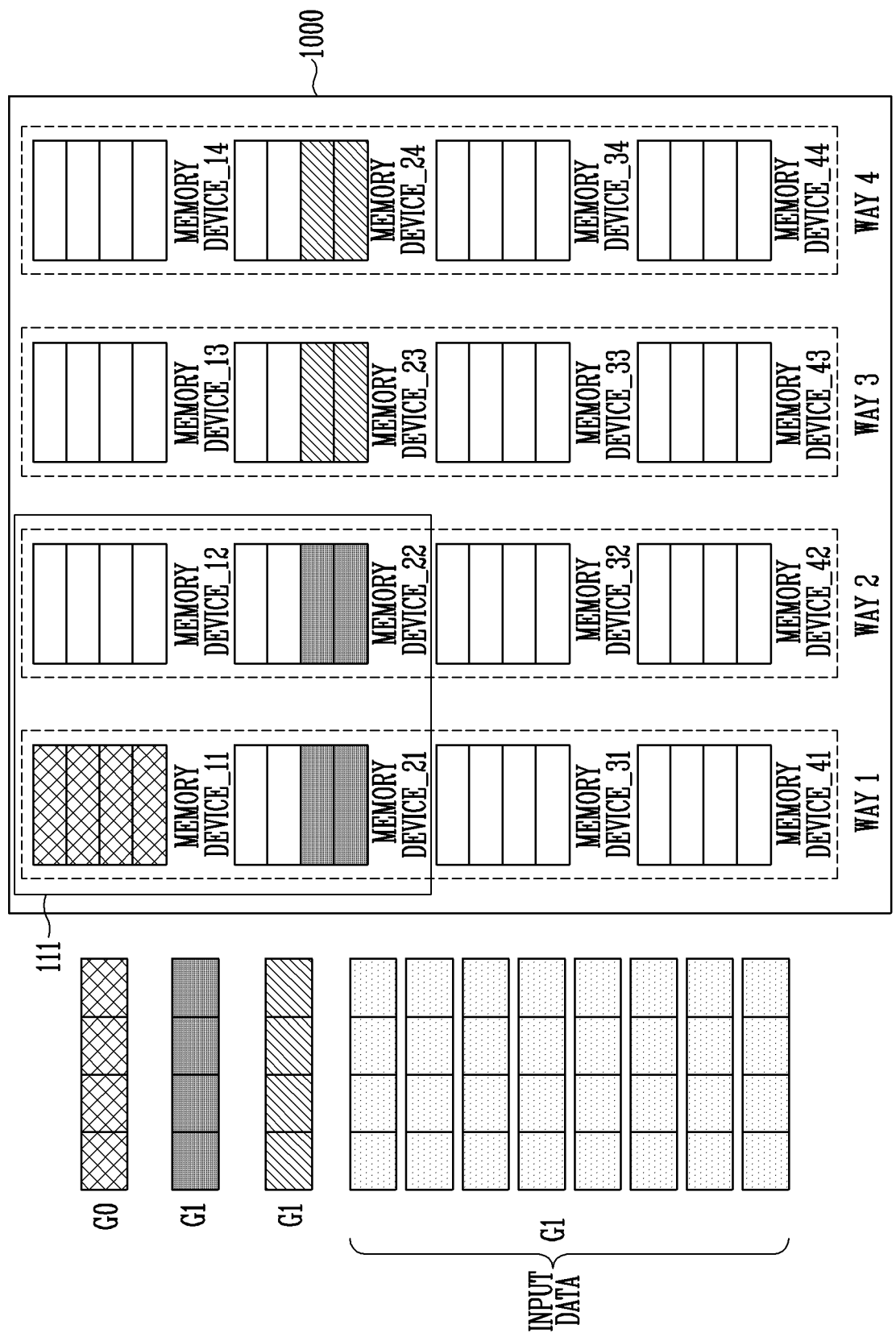
FIG. 10 is a diagram illustrating a compulsory return request of the achievement information according to an embodiment of the present disclosure.

FIG. 10 is a diagram illustrating a compulsory return request of the achievement information according to an embodiment of the present disclosure.

Referring to FIG. 10, the current memory package 1000 may be in a state in which the cross-slashed data blocks are stored in the memory device_11 with the graded performance G0. In addition, the memory package 1000 may be in a state in which 200 MB of dark-grayed data blocks is stored in each of the memory device_21 and the memory device_22 connected to the channel 2 CH2 and with the graded performance G1. In addition, the memory package 1000 may be in a state in which the forward-slashed data block of 200 MB is stored in each of the memory device_23 and the memory device_24 connected to the channel 2 CH2 with the graded performance G1.

Thereafter, the host 400 may provide, to the memory system 100, an input request for 3200 MB of data block (marked with a dot pattern in FIG. 10) with the target performance G1. In an embodiment of the present disclosure, at least eight memory devices may be required to input the 3200 MB of data block requested by the host 400.

Therefore, in an embodiment of the present disclosure, in a case the memory system 100 processes the input request with the lowest graded performance G0, the memory system 100 may require eight memory devices connected to the memory controller 200 through two channels. In this case, the channel interleaving and the die interleaving may be performed in a non-exclusive manner between memory devices connected to each channel. In an embodiment of the present disclosure, a method for inputting the 3200 MB of data block with the target performance G1 may be a method of storing data in two memory devices each connected to four channels. In this case, the channel interleaving and the die interleaving may be performed in a non-exclusive manner between the two memory devices connected to each of the four channels.

A method for storing the dotted data blocks with the target performance G1 may include a method of storing data in memory blocks corresponding to the ways WAY1 and WAY2, a method of storing data in memory blocks corresponding to the ways WAY2 and WAY3, and a method of storing data in memory blocks corresponding to the ways WAY3 and WAY4. The achievement information calculator 220 may select the method of storing data in the ways WAY1 and WAY2 in order to store the data blocks of 3200 MB. However, data may not be stored in ways WAY1 and WAY2 for the graded performance G1 due to data stored in one super block 111 corresponding to the memory device_11, the memory device_12, the memory device_21, and the memory device_22, data movement for the data stored in the super block 111 is required.

Figure 11:
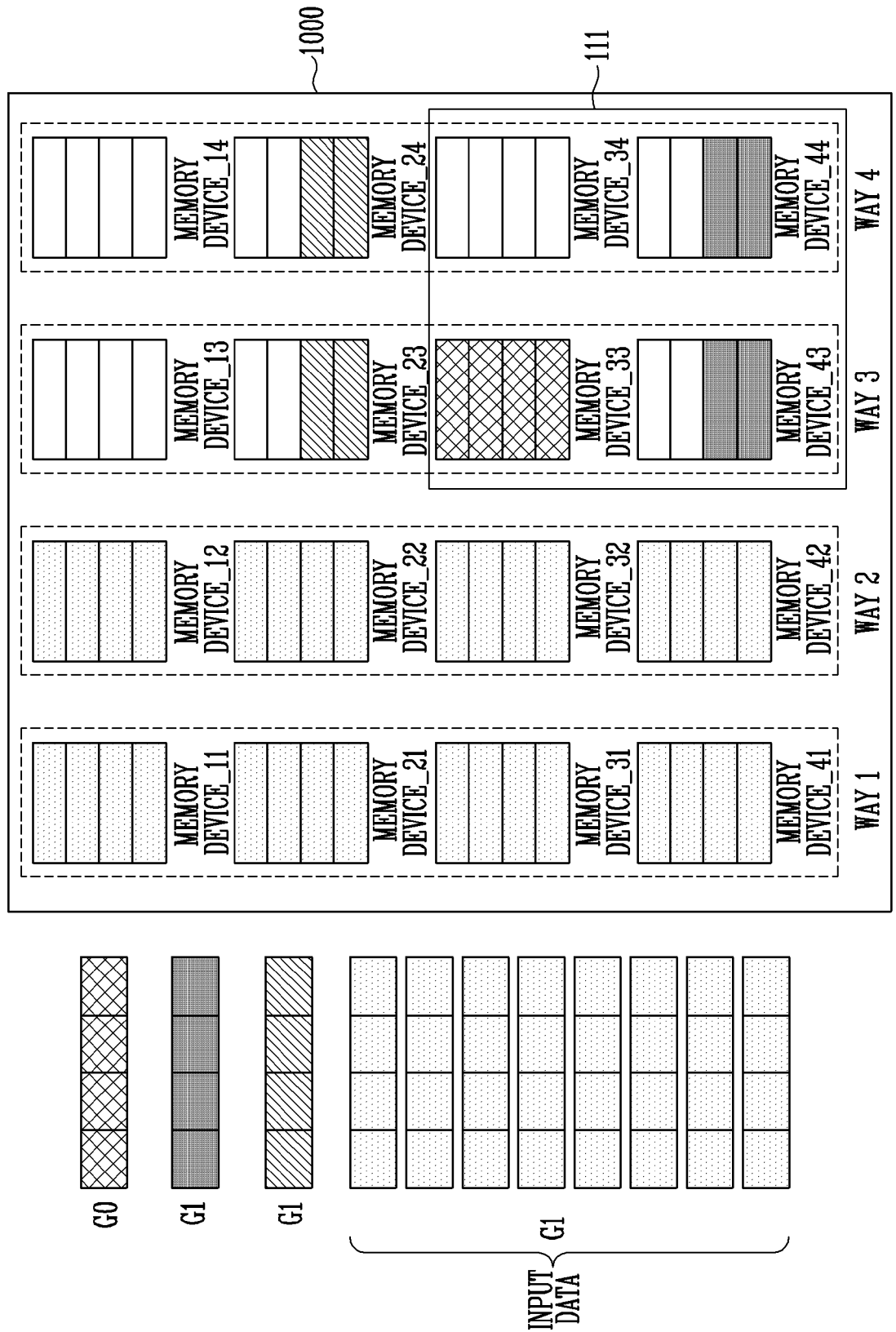
FIG. 11 is a diagram illustrating a process of rearranging data in the situation of FIG. 10.

FIG. 11 is a diagram illustrating a process of rearranging data in the situation of FIG. 10.

Referring to FIG. 11, the achievement information calculator 220 may move the data stored in the super block 111 in response to the achievement information compulsory return request. In order to store the dotted data blocks in the ways WAY 1 and WAY2 with the target performance G1, there may be several options as destinations to store therein the data from the super block 111, as follows: (1) the memory devices 13, 14, 23 and 24, (2) the memory devices 23, 24, 33 and 34 and (3) the memory devices 33, 34, 43 and 44.

However, since data are already stored in the memory device_23 and the memory device_24, the data stored in the super block 111 is required to be moved to the memory device_33, the memory device_34, the memory device_43, and the memory device_44. After moving the data stored in the super block 111, the achievement information calculator 220 may communicate with the memory package 1000 to store the dotted data blocks in the ways WAY1 and WAY2.

Figure 12:
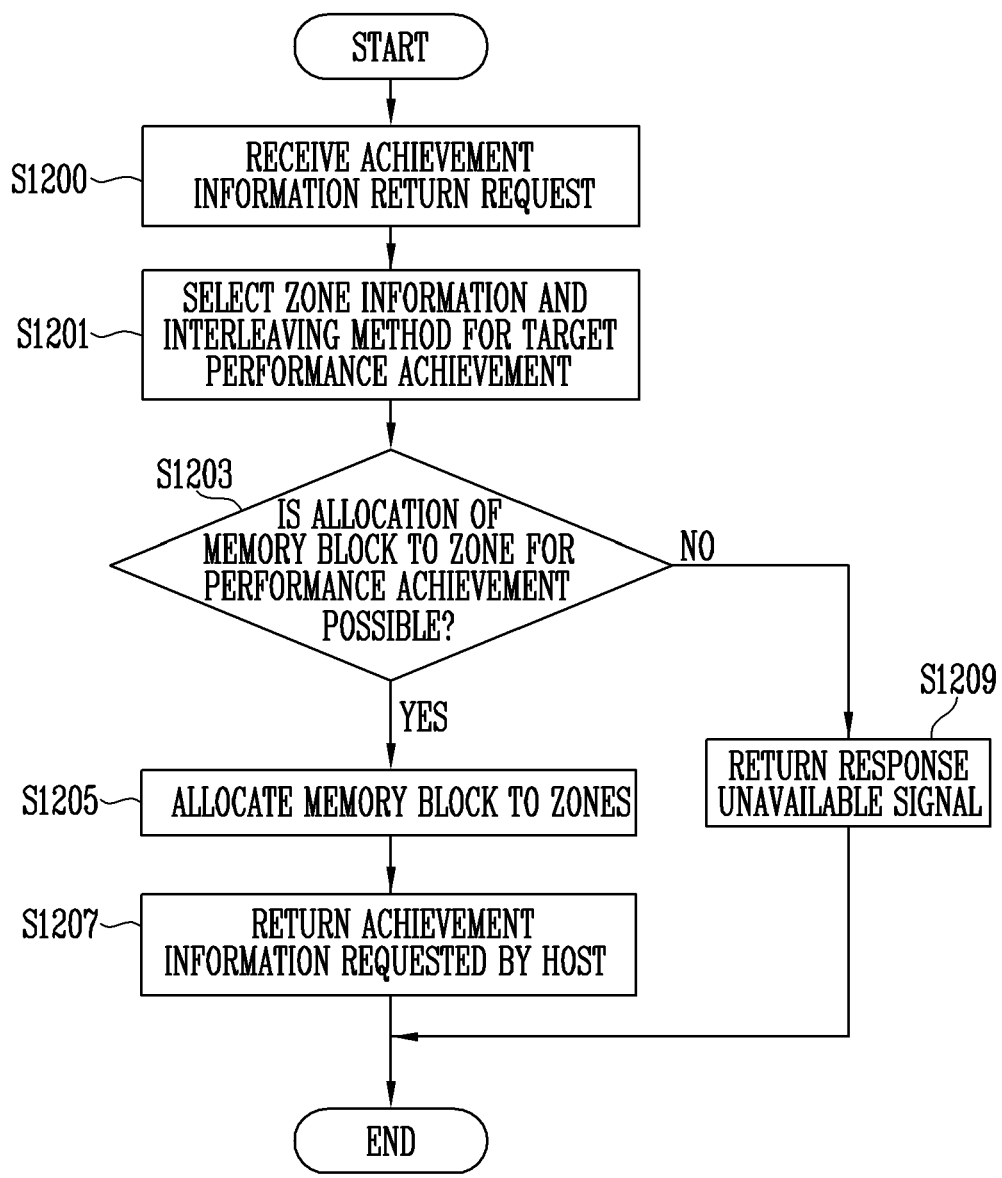
FIG. 12 is a flowchart for describing an operation of a memory controller for a return request of achievement information according to an embodiment of the present disclosure.

FIG. 12 is a flowchart for describing an operation of the memory controller 200 for the return request of the achievement information according to an embodiment of the present disclosure.

Referring to FIG. 12, in operation S1200, the memory controller 200 may receive the return request of the achievement information from the host 400. Specifically, the achievement information calculator 220 may receive the target performance and a return request of the achievement information indicating whether the target performance is achievable.

In operation S1201, the memory controller 200 may select, from the graded performance table 800, group information and an interleaving method necessary to achieve the target performance. For convenience of description, the group is a zone. Therefore, the group information may be zone information.

The target performance, and the group information and the interleaving method necessary to achieve the target performance may be stored in the graded performance table 800. The memory controller 200 may select information of the group necessary for achieving the target performance, and may select the number of necessary groups according to the selected information. In addition, the interleaving method necessary for achieving the target performance may be selected.

In an embodiment, when the target performance is the graded performance G1 that is one of graded performances listed in the graded performance table 800, the achievement information calculator 220 may select a single zone necessary for achieving the target performance G1 based on the graded performance table 800. In addition, the memory die interleaving method may be selected as an interleaving method required for the target performance G1 based on the graded performance table 800.

In operation S1203, the memory controller 200 may calculate whether memory blocks can be allocated to the zone based on the selected zone information. Specifically, the achievement information calculator 220 may receive, from the mapping information storage 230, mapping information on a current state of allocated memory blocks within the memory device 110. The achievement information calculator 220 may calculate whether memory blocks can be allocated to the zone based on the group information and the mapping information.

In operation S1205, i.e., when memory blocks are determined to be allocated to the zone for the target performance, the memory controller 200 allocates the memory blocks to the zone. In an embodiment, when the achievement information calculator 220 is to store data in two memory devices connected to each of two channels CH to achieve target performance, the achievement information calculator 220 may open the memory blocks in the four memory devices to configure a zone. Thereafter, four memory blocks are allocated to the open zone.

In an embodiment, when plural zones are selected to achieve the target performance, the memory controller 200 may allocate the memory blocks to each of the plurality of zones. For example, when two zones are selected to achieve the target performance, the memory controller 200 may allocate four memory blocks to each of the two zones.

In operation S1207, the memory controller 200 returns the achievement information to the host 400. Specifically, the achievement information may include the number and positions of the zones in which data is to be stored, and a data interleaving method of storing the data. In addition, the achievement information may include information indicating whether there is any available memory block that can be allocated to a zone for achieving the target performance.

In operation S1209, i.e., when memory blocks are determined not to be allocated to the zone for the target performance, the memory controller 200 may provide the host 400 with the non-achievement signal indicating that the memory system 100 cannot achieve the target performance when the memory block cannot be allocated to the zones to be allocated. Specifically, the non-achievement signal may include information indicating that the number of zones that can be allocated is 0 and information indicating there is no any available memory block that can be allocated to a zone for achieving the target performance.

Figure 13:
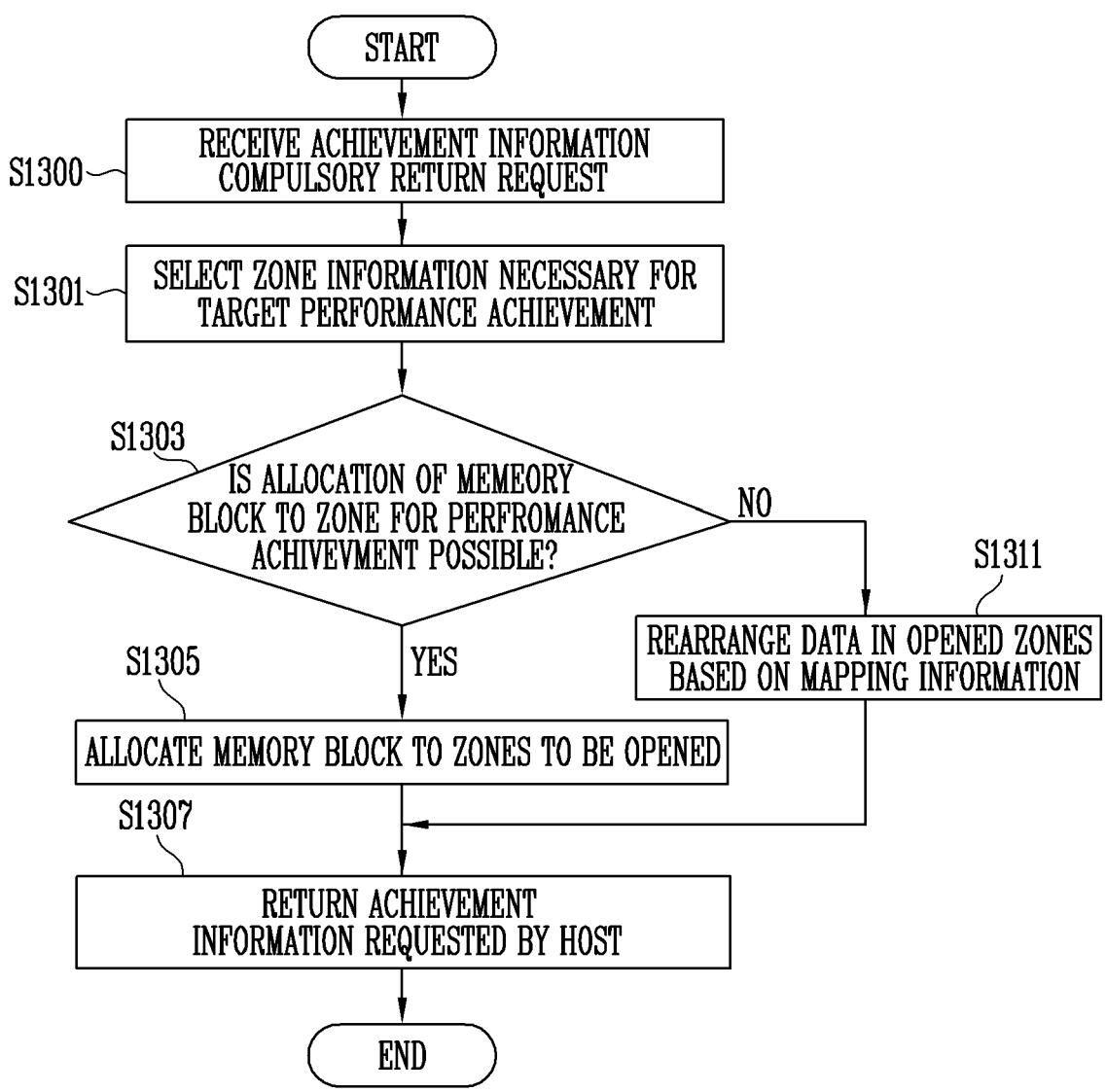
FIG. 13 is a flowchart for describing an operation of a memory controller for a compulsory return request of achievement information according to an embodiment of the present disclosure.

FIG. 13 is a flowchart for describing an operation of a memory controller 200 for a compulsory return request of the achievement information according to an embodiment of the present disclosure.

Referring to FIG. 13, in operation S1300, the memory controller 200 may receive the return request of the achievement information from the host 400. Specifically, the achievement information calculator 220 may receive the target performance and information indicating that achievement of the target performance is compulsory.

In operation S1301, the memory controller 200 may select, from the graded performance table 800, the group information and the interleaving method necessary for achieving the target performance. For convenience of description, the group is a zone. Therefore, the group information may be the zone information. The target performance, and the group information and the interleaving method necessary for achieving the target performance may be stored in the graded performance table 800. The memory controller 200 may select information of an appropriate group to achieve the target performance, and may select the number of necessary groups according to the selected information.

Specifically, when the target performance is the graded performance G1 that is one of graded performances listed in the graded performance table 800, the achievement information calculator 220 may select a single zone necessary for achieving the target performance G1 based on the graded performance table 800. In addition, the memory die interleaving method may be selected as an interleaving method required for the target performance G1 based on the graded performance table 800.

In operation S1303, the memory controller 200 may calculate whether memory blocks can be allocated to the zone based on the selected zone information. Specifically, the achievement information calculator 220 may receive, from the mapping information storage 230, mapping information on a current state of allocated memory blocks within the memory device 110. The achievement information calculator 220 may calculate whether memory blocks can be allocated to the zone based on the zone information and the mapping information.

In operation S1305, i.e., when memory blocks are determined to be allocated to the zone for the target performance, the memory controller 200 allocates the memory blocks to the zone. In an embodiment, when the achievement information calculator 220 is to store data in two memory devices connected to each of two channels CH to achieve target performance, the achievement information calculator 220 may open the memory blocks in the four memory devices to configure a zone. Thereafter, the achievement information calculator 220 allocates four memory blocks to the open zone.

In operation S1307, the memory controller 200 returns the achievement information to the host 400. Specifically, the achievement information may include the number and positions of the zones in which data is to be stored, and a data interleaving method of storing the data. In addition, the achievement information may include information indicating whether there is any available memory block that can be allocated to a zone for achieving the target performance.

In operation S1311, i.e., when memory blocks are determined not to be allocated to the zone for the target performance, the memory controller 200 may rearrange the data stored in the memory blocks within the currently selected zone based on updated mapping information. In an embodiment, the achievement information calculator 220 may receive the mapping information from the mapping information storage 230 and calculate a position of memory blocks to which the data is to be moved from the memory blocks within the currently selected zone to achieve the target performance. Thereafter, the achievement information calculator 220 may perform a data rearrangement process of moving the data from the memory blocks within the currently selected zone to the calculated position.

Figure 14:
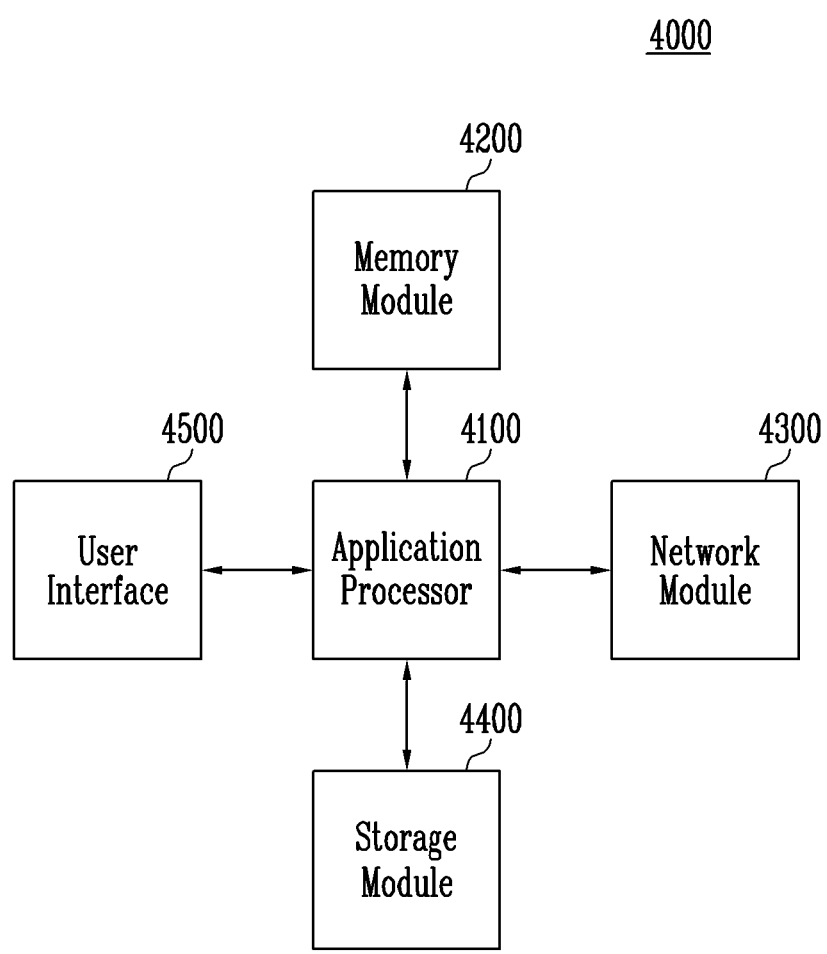
FIG. 14 is a diagram illustrating a user system to which a memory system according to an embodiment of the present disclosure is applied.

FIG. 14 is a diagram illustrating a user system to which a memory system according to an embodiment of the present disclosure is applied.

Referring to FIG. 14, the user system 4000 includes an application processor 4100, a memory module 4200, a network module 4300, a storage module 4400, and a user interface 4500.

The application processor 4100 may drive components, an operating system (OS), a user program, or the like included in the user system 4000. As an example, the application processor 4100 may include controllers, interfaces, graphics engines, and the like that control the components included in the user system 4000. The application processor 4100 may be provided as a system-on-chip (SoC).

The memory module 4200 may serve as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a non-volatile random access memory, such as a PRAM, a ReRAM, an MRAM, and an FRAM. As an example, the application processor 4100 and memory module 4200 may be packaged based on a package on package (POP) and provided as one semiconductor package.

The network module 4300 may communicate with external devices. As an example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. As an example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. As an example, the storage module 4400 may be implemented as a non-volatile semiconductor memory element such as a phase-change RAM (PRAM), a magnetic RAM (MRAM), a resistive RAM (RRAM), a NAND flash, a NOR flash, and a three-dimensional NAND flash. As an example, the storage module 4400 may be provided as a removable storage device (removable drive), such as a memory card, and an external drive of the user system 4000.

As an example, the storage module 4400 may include a plurality of non-volatile memory devices, and the plurality of non-volatile memory devices may operate equally to the memory device described with reference to FIG. 1. The storage module 4400 may operate equally to the memory system 100 described with reference to FIG. 1.

The user interface 4500 may include interfaces for inputting data or an instruction to the application processor 4100 or for outputting data to an external device. As an example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

Although the detailed description of the present disclosure describes specific embodiments, various changes and modifications may be made without departing from the scope and technical spirit of the present disclosure. Therefore, the scope of the present disclosure should not be limited to the above-described embodiments, and should be determined by the equivalents of the claims of the present disclosure as well as the following claims.

Although the present disclosure has been described with reference to the limited embodiments and drawings, the present disclosure is not limited to the embodiments, and various changes and modifications may be made from the disclosed description by those skilled in the art to which the present disclosure pertains.

In the embodiments described above, all of the steps may optionally be performed or omitted. In addition, the steps in each embodiment need not occur in order, and may be reversed. Meanwhile, the embodiments of the present disclosure disclosed in the present specification and the drawings are merely specific examples for easily describing the technical content of the present specification and facilitating understanding of the present specification and do not limit the scope of the present specification. That is, it is apparent to those skilled in the art to which the present disclosure pertains that other modification examples based on the technical spirit of the present disclosure are possible.

Moreover, the present specification and drawings disclose various embodiments of the present disclosure. Although specific terms are used, the terms are used in general meaning for purposes of easily describing technical content of the present disclosure and facilitating understanding of the present disclosure, and are not intended to limit the scope of the present disclosure. It is apparent to those skilled in the art to which the present disclosure pertains that other modification examples based on the technical spirit of the present disclosure may be carried out in addition to the embodiments disclosed herein and the following claims. Furthermore, the embodiments may be combined to form additional embodiments.

What is claimed is:

1. A memory system comprising:
   a plurality of memory devices each including a plurality of memory blocks which are included in a plurality of groups; and
   a memory controller configured to:
   receive, from an outside, information for target performance and a return request of achievement information indicating whether the target performance is achievable and including group information on each size and numbers of one or more necessary groups for achieving the target performance,
   provide the achievement information to the outside in response to the return request, and
   allocate memory blocks to the necessary groups based on the achievement information,
   wherein the achievement information includes data indicating an allocation method between the plurality of memory devices connected to the memory controller.

2. The memory system of claim 1, wherein the memory controller comprises:
   a performance information storage configured to store therein a graded performance table including information of graded performances of the memory system and information on numbers of groups, the numbers being required to achieve the respective graded performances;
   a mapping information storage configured to store therein mapping information on the allocated memory blocks; and
   an achievement information calculator configured to select the group information based on the graded performance table and the target performance, and provide the achievement information to the outside.

3. The memory system of claim 2, wherein the achievement information calculator provides, when the memory devices include available memory blocks to be allocated to the necessary groups among the plurality of memory blocks, the achievement information indicating that the target performance is achievable.

4. The memory system of claim 2, wherein the achievement information calculator provides, when the memory devices lack available memory blocks to be allocated to the necessary groups among the plurality of memory blocks, a non-achievement signal indicating that the target performance is not achievable.

5. The memory system of claim 3, wherein the plurality of memory devices are connected to the memory controller through a plurality of channels.

6. The memory system of claim 5, wherein the graded performances comprise:
   a first-grade performance representing that, among the memory devices, each memory device operates in an exclusive manner;
   a second-grade performance representing that, among the memory devices, plural memory devices connected through one of the channels operate in a non-exclusive manner;
   a third-grade performance representing that, among the memory devices, plural memory devices connected through respective channels operate in the non-exclusive manner; and
   a fourth-grade performance representing that, among the memory devices, plural memory devices connected through different channels operate in the non-exclusive manner.

7. A memory system comprising:
   a plurality of memory devices each including a plurality of memory blocks which are included in a plurality of groups; and
   a memory controller configured to:
   receive, from an outside, information for target performance and information indicating that achievement of the target performance is compulsory,
   move, to a second one of the memory devices, data from one or more already allocated memory blocks among the plurality of memory blocks within a first one of the memory devices,
   provide the outside with achievement information including group information on each size and numbers of one or more necessary groups for achieving the target performance, and
   allocate memory blocks to the necessary groups based on the achievement information,
   wherein the achievement information includes data indicating an allocation method between the plurality of memory devices connected to the memory controller.

8. The memory system of claim 7, wherein the memory controller comprises:
   a mapping information storage configured to store therein mapping information on the allocated memory blocks; and
   an achievement information calculator configured to receive the mapping information from the mapping information storage, and determine whether to move the data from the already allocated memory blocks to the second memory device.

9. The memory system of claim 8, wherein the achievement information calculator is further configured to:
   determine, when determining to move the data from the already allocated memory blocks to the second memory device, memory blocks included in the second memory device based on the mapping information, and
   move the data from the already allocated memory blocks to the determined memory blocks.

10. The memory system of claim 9, wherein the plurality of memory devices are connected to the memory controller through a plurality of channels.

11. A method of operating a memory system including a plurality of memory devices which are included in a plurality of groups and a memory controller, the method comprising:
    receiving information for target performance from an outside and a return request of achievement information indicating whether the target performance is achievable;
    calculating the achievement information including group information on each size and numbers of one or more necessary groups for achieving the target performance; and
    providing the achievement information to the outside in response to the return request,
    wherein the achievement information includes data indicating an allocation method between the plurality of memory devices connected to the memory controller.

12. The method of claim 11, wherein the calculating the achievement information comprises:
    receiving a graded performance table from a performance information storage;

receiving mapping information from a mapping information storage;

selecting a type of the necessary groups based on the graded performance table; and selecting one or more available blocks to be allocated to the necessary groups based on the mapping information.

13. The method of claim 12, wherein the providing the achievement information to the outside comprises providing, when the memory system includes available memory blocks to be allocated to the necessary groups, the achievement information further indicating that the target performance is achievable.

14. The method of claim 12, wherein the providing the achievement information to the outside comprises providing, when the memory system lacks available memory blocks to be allocated to the necessary groups, a non-achievement signal indicating that the target performance is not achievable.

15. The method of claim 11, wherein the return request includes information indicating that achievement of the target performance is compulsory.

16. The method of claim 15, further comprising moving, to a second memory device within the memory system, data from one or more already allocated memory blocks of a first memory device within the memory system when the first memory device lacks available memory blocks to be allocated to the necessary groups.

17. A computing system comprising:

a host device configured to provide information for target performance and a return request of achievement information indicating whether the target performance is achievable and including group information on each size of one or more necessary groups for achieving the target performance; and a memory system including a plurality of memory devices which are included in a plurality of groups and a memory controller configured to:

provide the achievement information to the host device when the target performance is achievable, and allocate a plurality of memory blocks to the necessary groups in response to the return request, wherein the achievement information includes group information on each size and numbers of one or more necessary groups for achieving the target performance and data indicating an allocation method between the plurality of memory devices connected to the memory controller.

18. The computing system of claim 17, wherein the host device comprises:

a data property controller configured to store the achievement information and generate a write request to be provided to the memory system based on the achievement information; and a memory system controller configured to communicate with the memory system to provide the write request to the memory system.

19. The computing system of claim 18, wherein the group information includes a number of the necessary groups, positions of the necessary groups and a data interleaving method for storing data in the necessary groups.

* * * * *